(12) United States Patent
Anand et al.

(10) Patent No.: US 9,778,826 B2
(45) Date of Patent: Oct. 3, 2017

(54) METHOD AND SYSTEM FOR COMPUTER-AIDED CONSUMPTION OF INFORMATION FROM APPLICATION DATA FILES

(76) Inventors: Indu Mati Anand, Chelmsford, MA (US); Anurag Wakhlu, Chelmsford, MA (US); Pranav Anand, Santa Cruz, CA (US); Ishan Anand, San Francisco, CA (US)

(*) Notice: Subject to any disclaimer, the term of this patent is extended or adjusted under 35 U.S.C. 154(b) by 627 days.

(21) Appl. No.: 14/119,881

(22) PCT Filed: May 24, 2012

(86) PCT No.: PCT/US2012/039482
§ 371 (c)(1),
(2), (4) Date: Jan. 25, 2014

(87) PCT Pub. No.: WO2012/162572
PCT Pub. Date: Nov. 29, 2012

(65) Prior Publication Data
US 2014/0149883 A1    May 29, 2014

Related U.S. Application Data

(60) Provisional application No. 61/651,520, filed on May 24, 2012, provisional application No. 61/572,826, filed on Jul. 23, 2011, provisional application No. 61/519,578, filed on May 24, 2011.

(51) Int. Cl.
*G06F 3/0484* (2013.01)
*G06F 17/24* (2006.01)

(52) U.S. Cl.
CPC ........ *G06F 3/04842* (2013.01); *G06F 17/241* (2013.01)

(58) Field of Classification Search
CPC .......................... G06F 3/0484; G06F 3/04842
USPC ......................................................... 715/751
See application file for complete search history.

(56) References Cited

U.S. PATENT DOCUMENTS

| | | | | |
|---|---|---|---|---|
| 7,281,008 B1* | 10/2007 | Lawrence | ......... | G06F 17/30864 |
| 2004/0153504 A1* | 8/2004 | Hutchinson | ....... | G06F 17/30017 |
| | | | | 709/204 |
| 2004/0205575 A1* | 10/2004 | Wattenberg | ....... | G06F 17/30899 |
| | | | | 715/205 |
| 2006/0277482 A1* | 12/2006 | Hoffman | ............... | G06F 17/241 |
| | | | | 715/764 |
| 2008/0046845 A1* | 2/2008 | Chandra | ........... | G06F 17/30905 |
| | | | | 715/856 |

* cited by examiner

*Primary Examiner* — Andrea Leggett
(74) *Attorney, Agent, or Firm* — Law Offices of Indu M. Anand

(57) ABSTRACT

The present invention provides a system and method for collecting and aggregating user-generated data based on user provided parameters and measures of relevance of underlying content. A user's data is combined with already existing collective data to generate relevant mark-ups for a document or other consumable data file, such as audio or video. The marked-up version of the document or data file is then displayed to users to, inter alia, help increase efficiency and assist in comprehension.

16 Claims, 13 Drawing Sheets

Figure 1 – Flow chart of the basic structure

Figure 2 – Review Process

Figure 3 – Coarse Highlighting of an image

Figure 4 – Integrating new mark-ups

Figure 5 – Listen/ View Process

Figure 6 – Sample User Interface for Reading a Dcoument

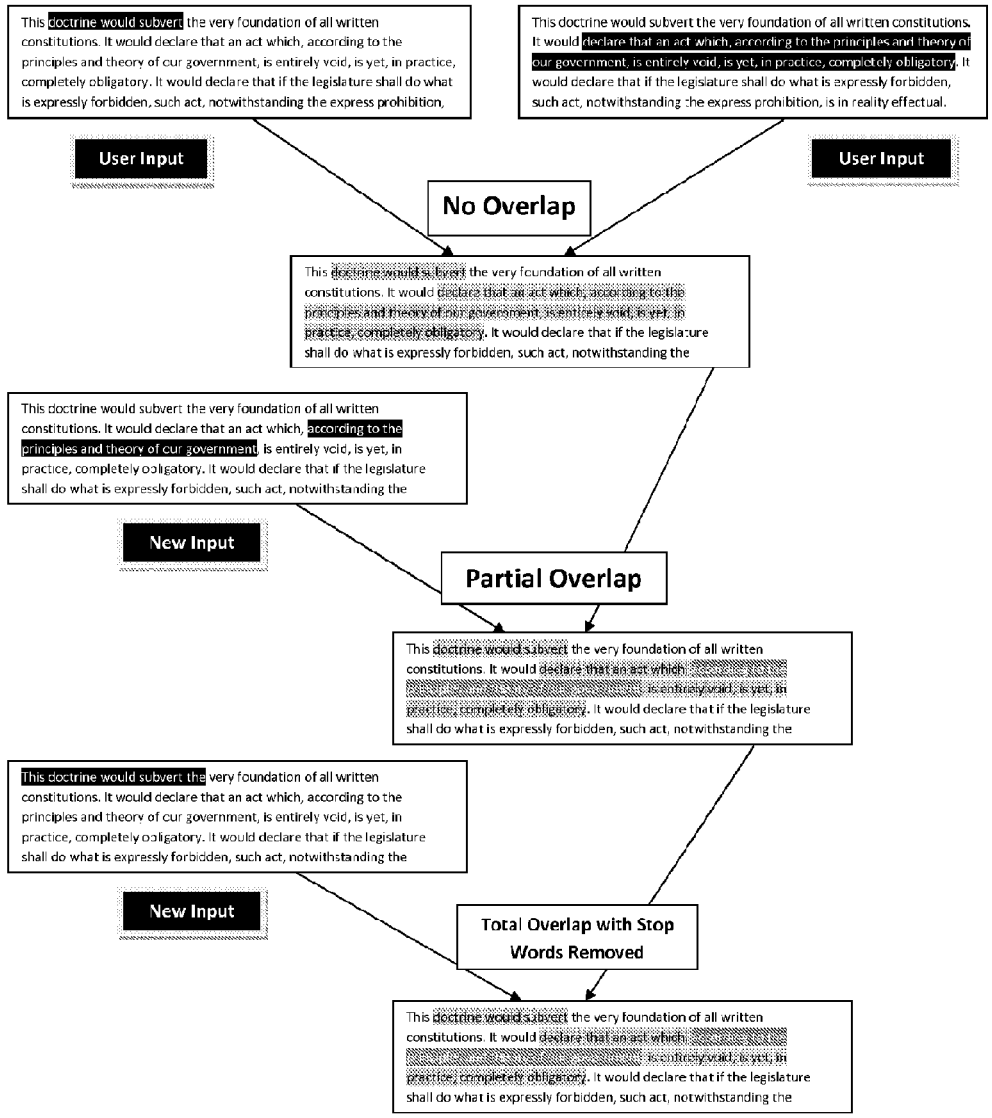
Figure 10 – Integrating Highlights

| Collective (down) / User (across) | Highly relevant | Relevant | Somewhat relevant | Not relevant |
|---|---|---|---|---|
| Highly relevant | Highly Relevant | Relevant | Relevant | Somewhat relevant |
| Relevant | Relevant | Relevant | Somewhat relevant | Somewhat relevant |
| Somewhat relevant | Relevant | Somewhat relevant | Somewhat relevant | Not relevant |
| Not relevant | Somewhat relevant | Somewhat relevant | Not relevant | Not relevant |

Figure 11 – A Collectivization Matrix

Coarse to finer markup, as described in "multi pass" highlighting.

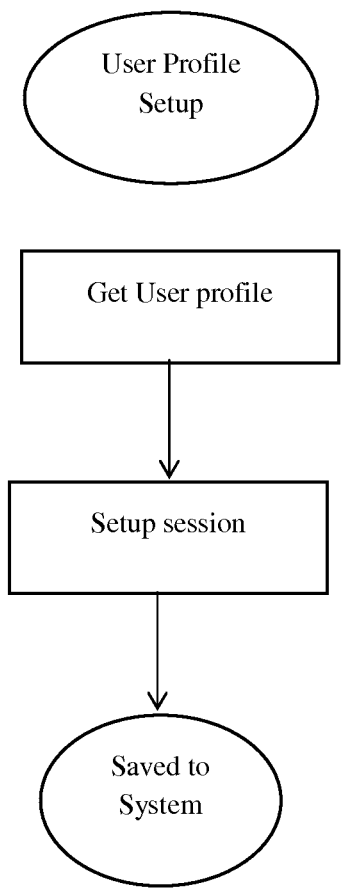
Figure 13 -
Basic Profile of User

METHOD AND SYSTEM FOR COMPUTER-AIDED CONSUMPTION OF INFORMATION FROM APPLICATION DATA FILES

CROSS REFERENCE TO RELATED APPLICATIONS

This application for patent is filed under Patent Cooperation Treaty and is related to three prior provisional patent applications filed in the USPTO: Application Ser. No. 61/519,578, entitled "A Method and System for Computer-Aided Reading or Listening or Viewing Application Data Files" filed on May 24, 2011, by two of the present inventors, Indu M. Anand and Anurag Wakhlu; Application Ser. No. 61/572,826, entitled "A Method and System for Computer-Aided Reading of documents and for Reading, Listening or Viewing Application Data Files" filed on Jul. 23, 2011 by three of the present inventors, Indu Anand, Anurag Wakhlu and Pranav Anand; and, a provisional patent application entitled "A Method and System for Computer-Aided Reading, Listening or Viewing Application Data Files" filed by all four of the present inventors on May 24, 2012. The content of all prior provisional applications is herein incorporated by reference.

FIELD OF THE INVENTION

This invention relates to a computerized method and system to assist a user in consuming information and content, for example, by reading, viewing, or listening, from various document and data files employing "crowd-based" functionalities for the consumption, viz., reading, viewing, listening and editing. This PCT patent application compiles the disclosures in all three of the prior provisional applications.

BACKGROUND OF THE INVENTION

Assistance of the computer is widespread in many human endeavors, particularly since common access to the Internet, and the computer now is a prime tool for creation of new "information" and "crowd-based" solutions to problems, wherein the solution for one is obtained from the input of many users, generally provided on the Internet. However, activities such as reading, listening and viewing, related to the consumption and absorption of that information, remain largely solitary. The present invention discloses the methods and systems that utilize the effort and experience of other users for crowd-sourced, computer-assisted improvement of the outcome and experience of a consumer, reader, listener or viewer, etc.

An elementary example of such a utility is a method and system that assists a reader of a text file by providing "highlighting" by one or more prior readers of what they regarded the significant segments of the text. The reader in this example can then pay special attention to the highlighted segments of the text and generally save reading time and, if the prior reader(s) have correctly highlighted the important sections, then have a better comprehension of the key parts of the text. If the reader agrees with the significance attached to the sections highlighted by other readers, then it would provide positive reinforcement, but in any case would help the student-reader more easily climb the learning curve.

This would often be true of books and articles dealing with complex subject matter for a general audience. An article on the consequences of industrialization in emerging market countries, for instance, may have information on population dynamics and urbanization scattered across the length of the article. An expert environmentalist looking for the environmental impact of those trends may find only a few segments worth reading, but a college student studying economics may need to study much more of the article to understand the play of forces at work in the phenomenon. Looking at what the experts found valuable may orient the student in his own reading of the article, which depending on his attainment, may be more efficiently organized by the importance of the information than by starting at the beginning and linearly reading the article.

Or, in case of a reader of fictional literature, annotations by prior readers could help a reader spot sections relating to different themes, quickly and within the context of the entire book.

Such use of the marked-up material is one example of "crowd-based intelligence" in its simplest form. Prior readers of academic texts mark the important sections of the document, which leaves later readers with the advantage of more-easily identifying those and other important sections in a particular text. Some readers may choose to ignore a prior reader's notations because the new reader either disagrees with the importance of that highlight or underline, or because that reader is more concerned with another area of the text more pertinent to the particular interest of that reader at that particular time. However, regardless of that reader's interest or motivations for reading the document, the repeated marking of important sections by other readers will continually identify further areas of the document that are of interest to the readers. Continued review and marking may lead to multiple highlighting of the same section or area of the document. Multiple markings by multiple viewers will, in turn, indicate to the reader the importance of that section or area of the document for other readers for any specific purpose, and may lead to a reader more closely attempting to comprehend that section.

Other examples of crowd-based intelligence abound. For example, several websites employ it to guide a user in decision-making using recommendations for online shopping, tracking the popularity of well-known public personalities or music, or even buzzing up an article or a blog published on the internet. The previous users' views in these applications are collectively indicated by some form of indexing or depiction, often using icons such as stars.

Internet sites known as "wilds" that allow users to post and collectively edit information on a particular topic are a somewhat related example. The posted information owes its validity to the agreement and knowledge of the crowd. Experience with wilds and other web-based content integrators shows that this crowd-based method largely succeeds in providing good information.

However, while the wilds' crowd-based technologies provide collaborative development of documents by a large group of contributors actively shaping the content, a reader is left on her own for reading the document. The focus of the present invention, on the other hand, is the consumption of the content, with the help of an intelligent crowd. Furthermore, unlike other crowd-based utilities and services which provide information about the content, the methodology of the present invention breaks down the content to help with the user's actual consumption.

Several mechanical aspects of the technology employed by the present invention are known in the art, for example, highlighting portions of an article through format differentiation, including typeface, underlining or color. Writers of articles themselves or the readers may use highlighting- or underlining of portions of articles that they regard as significant for their purposes, for instance, to emphasize, reinforce or memorize the content.

However, unlike those uses of highlighting, the present invention discloses novel use of highlighting or marking-up of the file content by many users to synthesize the content into a form to actively assist the user in activities such as reading, listening, viewing of the file.

The use herein of highlighting or marking-up of an article or application data file is also distinguishably distinct from the various annotated publications, for instance, the literary, scientific, medical, legal, political and other types of periodicals or journals, where the annotations are not a direct result of "crowd-based intelligence" and are not systematically assembled from the inputs from many users.

As used in the invention disclosed in this and related applications, "crowd-based intelligence" model forms the backbone of a method and a system in which a number of reviewers are able to highlight, edit and review content materials and share their highlights, reviews and edits with other users. This method and system operate so that as more users identify important file sections, the more the later users benefit from their collective, synthesized insights.

Highlighting as used in this invention also differs significantly from the forms of web annotation in programs, such as "Google Sidewiki" and "Reframe-It," which allow users to post comments on the content within a website. These programs run in conjunction with web browsers so that when a user accesses any web viewable page, the program can retrieve comments associated that webpage. Frequently, then the program invites or allows the user to make his or her own comments.

However, programs of this type of web annotation simply add more content to the website, making no attempt at integration of the input from the multitude of users. Thus, the intelligence of the crowd is not being utilized as fully as in the present invention.

The notion that guides and informs the present invention is the following: The true advantage of a crowd-based system is realized if the large number of user inputs is eventually combined into measurable indices of "relevance" (or similar parameters) for the user, at least in statistical terms. Without such combination, a user is forced to wade through annotated data of many individual inputs with no help to determine what is most accurate, relevant and important.

Furthermore, unlike other prevalent methods and systems, the present invention shows how crowd-sourced inputs may be combined to assist and direct the consumer of the content to the relevant and important parts of the content, thus with a view to improving the knowledge, understanding and experience of the user with regard to content consumption, whether reading or listening or viewing the content files.

SUMMARY OF THE INVENTION

The present invention discloses methods and systems to allow users to mark-up content and share their mark-ups, highlighting, comments and annotations with other users thereby assisting consumers of the content; for example, it can assist readers to improve the reading speed, comprehension and retention of the contents of document files.

More generally, this invention permits a user to consume the content, such as by reading, listening to or viewing documents or other data files in a non-linear manner, guided by the inputs of other users but consistent with the user's abilities, interests and priorities.

In order to improve the efficiency of reading, listening or viewing etc., each user-generated highlight or mark-up is synthesized with the collection of previously created mark-ups. The synthesizing algorithms generally depend on the nature of content and the readers' abilities and preferences. Each highlighting may be integrated into the existing mark-ups through algorithmic, mathematical or statistical calculations, designed to determine the relevance of each annotated section. The computations for synthesis may be general purpose or may be custom generated following the criteria provided by the consumer. As the number of prior users grows, with each successive mark-up on the same section of content, the relevance rating of each annotated section becomes more accurate and stable. "Relevance" in this context is an example of the parameters with respect to which the "crowd" input can be synthesized. Other examples of parameters are given herein.

An additional benefit of using the "wisdom" of the crowd is that it provides a scalable architecture, which does not necessarily require a dedicated team of editors. Instead, the system relies on its users to both generate and consume the content.

In the context of reading a document, the method utilizes an "intelligent crowd" to help another reader read a document, whereas the idea is suitably modified and extrapolated for the case of consumption of a data file in other formats, for example, audio or video. "Intelligent crowd" in this context means a group of users who have previously read (or consumed, listened or viewed) same document (or data file) and have identified the usefulness of its various segments according to one or more given definitions of usefulness. The reader, in this context, may or may not be new to the document or the subject matter, and may be part of the crowd whose collective intelligence contributes to the overall crowd-generated marked-up document or content.

The method, and corresponding implementation system, in the specific case of reading a document for example, envision segments of a document to be categorized by many a previous user who read the document and provided values of various parameters for synthesis, which parameters may be based on criteria, including each user's own familiarity or expertise in the subject matter and her estimate of the "significance" of the segment for a set of specified purposes. This "intelligent" crowd of users is collectively called "editors" or "reviewers" and may include human users as well as machines, devices, or programs that otherwise meet the relevant criteria and provide information about usefulness of the segments of the document for specified purposes. The machines, devices, or programs that serve as editors or reviewers may be operable by hardware or software. The "reader" in this context may be new to the material or the document, or may be someone who previously quickly scanned the document and is returning to read it in depth. The crowd-based, collectivized highlighting or marking up may include his previous input on marking up of the segments as well.

Some examples of the criteria used to categorize segments of the document are given below, which may guide any actual implementation of the invention.

More generally the present invention discloses novel, general purpose, crowd-based methods and systems to mark-up (e.g., by highlighting, or other formatting features for differentiation) a document, or data file in alternative media such as audio or video, at the segment level for the purpose of consumption "efficiency" as desired or determined by a consumer who wants to take advantage of the input by other consumers. These other consumers, for example in the case of a document, are the readers that previously read the same document, or, in the case of other media have listened or viewed the data file and similarly provided their inputs to be included in the synthesized collective version.

A segment of the data file is an identifiable portion of the data file which may be referenced as such by the editors, reviewers or consumers. In a document, for example, it may be a word, a phrase, a sentence or a paragraph, even a single alphanumeric or special character, or one or more page lengths in the document. For a video file, it may be an individual frame or cel or part of either that can be identified therein. For an audio file, it may be a note, syllable or a fraction thereof or one or more words of a song. Other examples are: for an audio file sound stream from a single instrument in an ensemble, and for a video file a single object in the stream. The key is that it should be possible to mark-up such a segment of the data file, and communicate said mark-up to the system.

As noted above, there are significant differences between the summarizers or "integrator" programs on the one hand and the present invention on the other hand. The present invention goes far beyond summarizers and integrators, covers a broader spectrum of parameters under user control, and most importantly, may be used to actively assist in efficiently reading of the document or in consuming content by way of listening or viewing other media files.

In programs which provide reader comments and highlights, such as Google Sidewiki and Reframe-It, there is however, no combination of comments, beyond a ranking of reader comments. In contrast, the present invention combines the highlighted segments by each of the users, then displays to the user/reader the most relevant sections on demand. Furthermore, additional, parenthetic comments with highlighting may be rated and be grouped together as well.

For example, if 100 users of Google Sidewiki all commented on the same sentence in a website, that program would display each and every comment and its associated highlight, or alternatively, only those with high enough rankings. In the present invention, the highlights would be combined where they overlap and could be displayed more prominently based on a "relevance" computation or rating, or both. This allows for the combination of collective user intelligence, as well as a condensed method of displaying a large number of mark-ups. In addition, the comments associated with each highlight could be grouped together with other similar comments. This may allow a reader to find common themes and characters, for example, and optionally allow the system to classify highlights based on their associated comments.

A very flexible scheme is envisioned for classes or categories of comments: The classes or categories of comments or various dimensions of differentiation of highlights may be created and added by an editor/reviewer for sharing with the wider audience, or for private use by a reader/listener/viewer. The implementation of the system can thus grow organically, and the category/class structure will be developed based on collective inputs as more categories are added. For instance, a category such as "history of labor relations" may be created as a tag by a user while reviewing or reading one or more articles of interest for highlighting or commenting within the categories of Law, History or Economics, depending on their needs. The system application will maintain the library of these tags.

It is envisioned that, as the number of users increases for a given document, there will be more distinct levels of "significance" or "importance" generated for various portions of the data files, as well as a greater diversity in consumer classification. User interest will allow the system of categories to evolve, with more numerous categories to float up as infrequently subscribed categories drop in the hierarchy. These aspects of the invention are described in more detail in Detailed Description.

The methodology of the present invention can also be used for other uses, collaborative development of content in hitherto unavailable ways, for instance. For example, it can allow the synthesis of a document or data file across multiple revisions. In the case where there are 5 versions of a document, for example, its 14 collaborative editors can highlight certain segment(s) in the revision versions and by using the methods and system of this invention, automatically generate the collectivized final copy, using their preferred versions in the revision history.

Conceived in the context of this invention is a powerful, novel method of highlighting as a multi-step process: In a first pass broadly identify the pages, paragraphs or passages of significance via special marking command, then identify the exact segment or segments within the identified pages, paragraphs or passages on a subsequent step. As explained below, this multi-step highlighting process provides important advantages for all types of data files, text documents and data files in other media, to be processed according to the methods of this invention.

Additionally, since activity of highlighting/marking-up of a data file is the primary functionality utilized by a system of this invention, it is envisioned to provide a novel, rich tool box of capabilities for creating and communicating the "highlighting." A dedicated component of the system may carry out the data maintenance and processing of the "highlighting" functionality.

BRIEF DESCRIPTION OF THE DRAWINGS

FIG. 10 is a diagram showing one method for integrating highlights.

FIG. 11 illustrates a matrix for collectivization of highlighting by pairwise integration.

FIG. 13 illustrates the structure of the reviewer's stored profile.

DETAILED DESCRIPTION OF THE INVENTION

Figure 1:
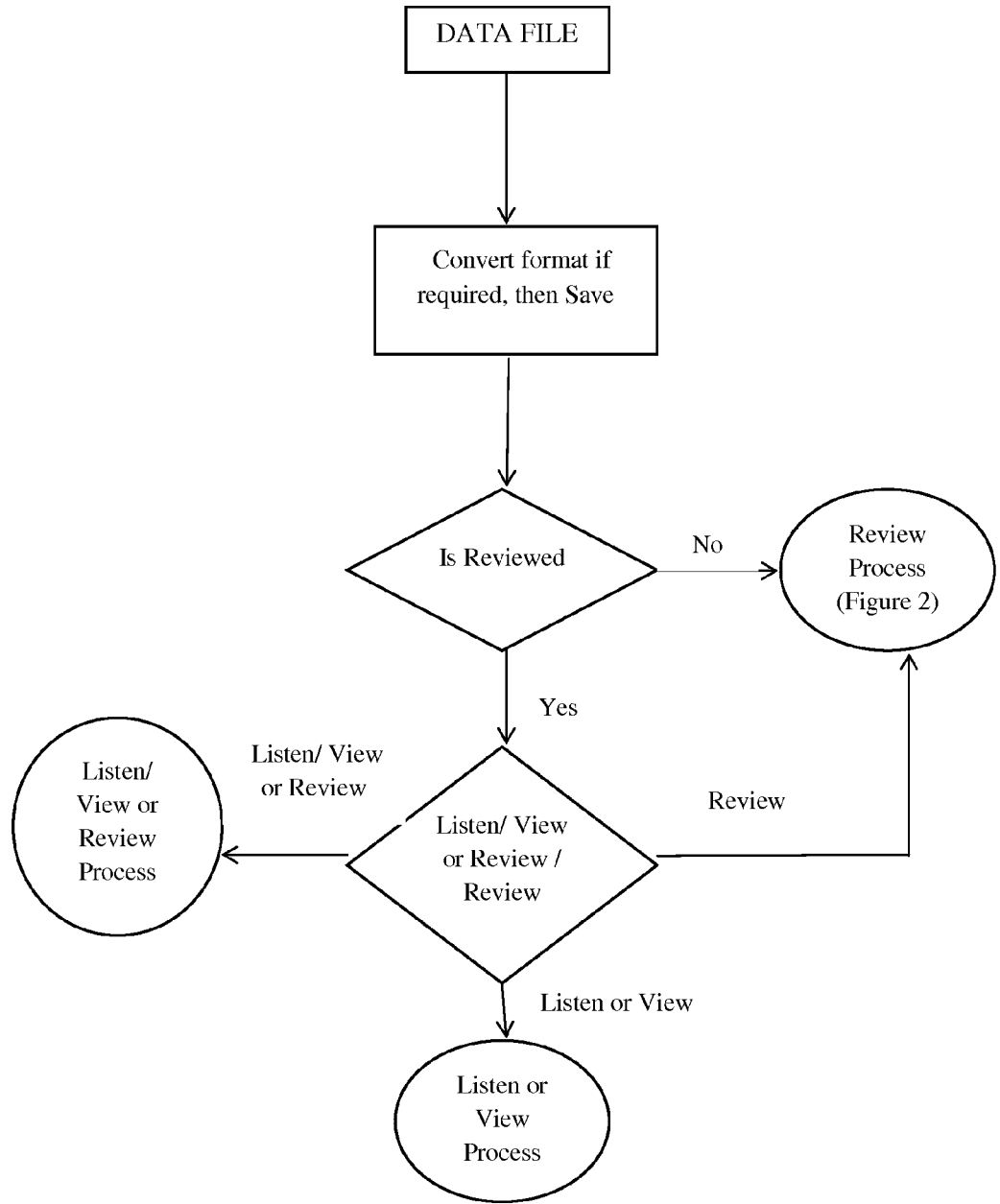
FIG. 1 is a flow chart of the basic structure of the invention.

The essence of the invention is a method and system for increasing efficiency of the consumption of information, for example by reading listening or viewing content, and for improved comprehension by utilizing crowd-sourcing to create an accurate reflection of the most relevant segments of the desired content. As each editor-highlighted (or marked-up) segment of the data file is added into the collectively processed file, the system of this invention performs a calculation (which may be a statistical or probabilistic calculation) to determine the "significance" or "relevance" of the segment. The meaning of significance or relevance in this context may depend on the subject matter, reader and/or reviewer preferences or on other specific criteria that impact the significance and are well known in the art. As more highlights are added this process leads to a more stable and accurate result.

The method and system as it pertains to text files was described in the related provisional patent Application Ser. No. 61/572,826. In another related provisional patent application it was extended to the case of data files containing content in alternative media, such as audio or video or visual images. The method is extends to media other than text in self-evident ways. The core concept is indeed extensible to alternative media, whenever the meanings of "segment," "highlight or mark-up" and "significance" etc. can be ascertained or specified and when the set-theoretic notions of union and intersection of two non-identical segments can be discerned or assigned. Some differences between these other media and text, however, merit detailed discussion, as provided herein.

Video segments may be highlighted in wide variety of ways. The simplest form is highlighting a single object within a video. A segment of a video may be as small as a single pixel. A single object may persist throughout any number of frames of the video. This allows for greater precision for both users and any calculations based on the highlights. Highlights need not be limited to a single segment of a video file, but may extend across multiple segments and files. Once multiple editors highlight the same segment, the system will automatically combine the inputs. As with text, combining and synthesizing multiple highlights for video or image files allows for many individuals to determine the most relevant and/or accurate segments. Once the highlights are combined, the system may also produce a separate video that is comprised of all the most relevant sections.

The method of this invention as applied to Images closely follows the model for video files. The user may mark up any part of the entire image, and can connect multiple sections of the image into a single highlight. Highlights may span multiple images, using any available medium.

The present invention may be used to highlight audio data files for user consumption in a similar manner, described for video, or text. Audio is a representation of sound, electrical or otherwise. With some modifications, the guiding principle of claimed system is valid for audio files, and allows users to highlight segments of the data, which the system will then combine for relevance, allowing for a user to more easily consume the information.

A pictographic language presents an interesting similar case since it shares features both of images and text. With modifications, the method is available for this form of languages, since natural meanings can be assigned to the terms "segment", "highlighting" and "significance."

Forms of Highlighting

Highlighting or marking up of a file can be accomplished in several ways, and one may choose between forms appropriate to the medium or format of data file that allow for a communicable definitions of segmentation, significance and mark-up.

Thus for example, depending on the format of the data file, the marking/highlighting action can be accomplished in any of the ways described in the next few paragraphs.

For Text:
  i. Identify the segment by an action similar to underlining a segment on paper, for example, marking the beginning and the end of the segment via function keys, by using a stylus, touch on touch-screen, clicking and/or dragging the mouse, etc.;
  ii. Identify the segment by indicating the beginning and end of a segment by using special commands, delimiting characters by inserting suitable icons, or by specific action, e.g. clicking on work surface or tapping screen with stylus a certain number of times etc.;
  iii. Identify the segment in multiple passes, e.g., in a first pass broadly identifying the pages, paragraphs or passages of significance via placement of a special mark within such broadly identified item, then identifying precise segment(s) of significance within on a subsequent pass;
  iv. Provide a tool box of, and system support for, commands and actions, which allow the user to quickly generate a coarse (broad level) identification of pages, paragraphs or passages of significance, or to specify the precise, "finer level" identification of segments; these commands/actions may be implemented with graphic icons;
  v. Enable the system to generate coarse segmentation by automatically calculating the beginning and end of the broad segment from a single command, click or placement of an icon by the user; examples of coarse segmentation include a line, paragraph, or page within which the icon or click is placed;
  vi. Provide a tool box that includes "highlighting" commands, inter alia, for: indicating levels or tiers of significance; delimiting the segments (for example, indicating the beginning or end of segment by employing special characters instead of dragging a mouse over a long segment); special tools/commands for indicating "private" versus "sharable" highlighting; special tools/commands for indicating or placing the comments associated with, or without, corresponding segment highlighting; special tools/commands for indicating the medium (e.g., text/image/audio/video or other media) of a comment; special tools/commands for indicating the nature of a comment (e.g., theme/subject related to the comment, general comments such as "unrelated to highlighted segment," "exactly on point" etc.).

vii. Advantages of marking in stages: doesn't slow down the reader, allows for recapitulation, system can bring up the identified passages on review for marking up viii. Coarse page/paragraph/passage/etc. identifiers may be "color coded" or otherwise differentiated to signify parameter differentiation, for example, the significance level, nature of comment etc.

For Sound/Audio:

(i) Identify audio segment by the time stamp specifying beginning and end;

(ii) Specify words/text in the audio if associated with accompanying nonverbal part of audio file;

(iii) Identify specific instrument from an ensemble in the audio file;

(iv) Specify a sound, note or syllable;

(v) Specify the "coarse" segmentation by any of the methods i-iv, then specify the mark up in finer detail in subsequent passes;

For Visual image/Video:

(vi) Identify video segment by time stamp specifying beginning and end;

(vii) Specify words/script in the video or accompanying nonverbal part of video file;

(viii) Identify an object that is differentially discernable;

(ix) Identify the pixel(s) that are differentially identifiable;

(x) Specify the "coarse" segmentation by any of the methods i-iv, then marked up segments in detail in subsequent passes;

(xi) Specify the "coarse" level identification of the segment by a tool or icon for easy placement, for example, by drawing a box around the area of interest.

Processing and Synthesizing of Marked-Up Data Files

The central idea behind this invention is that a consumer of information (reader/listener/viewer/etc.) will benefit from the knowledge and expertise of all previous users; Collective "intelligence of the crowd" will help guide the consumer to the most important sections of the data file, increasing efficiency and comprehension, and improving experience.

Several possibilities exist to achieve that end for the processing of highlighted/marked up data files. Thus, in one embodiment of the invention, the editor reading a given document, or listening to an audio file or viewing an image or video file, may mark-up an important segment, and may share what the editor views as "important" with all other users according to a definition of "important" or "significant" that is published to editors, consumers of content and other users. The highlighting of the data file may be accomplished in some embodiments by simply selecting the appropriate material and submitting it, either through express commands or implicitly as a result of marking-up. The editor may also have the opportunity to add further comments with or without sharing the highlighted segments.

In another potential embodiment, in addition to highlighting a segment to demonstrate that it is important, the editor may indicate that a particular segment is not important or not relevant. The system would then take this into account in its overall relevancy calculations. Additionally, the user (an editor/reviewer or a reader/listener/viewer) may be given opportunity to rate a segment with regard to relevancy or another independent criterion, by utilizing graphic or numerical rating models.

In another embodiment the editor could also rate the comments. This would be considered in the calculation of comment relevance. In addition, editors could also comment on comments, to further levels of recursion.

Once a selection is made and submitted, it is combined with previous selections. If two selections overlap, then they may be combined using one or more mathematical or statistical formulas or algorithms.

In one possible embodiment, the combination is made using a matrix. In this method, when two editors highlight the same selection, the system would refer to a stored matrix to determine how the highlight will appear to the reader. If the two editors mark the same selection identically, then the matrix calculation may tell the system to display the highlight in their common, preset way. If the two editors disagree in classifying the highlighted section, then the matrix would calculate which of the two distinct highlights will be displayed (and how), or calculate and display a third classification synthesized from the two distinct classifications. This may be accomplished in several ways, including providing different weights to their respective highlights, optionally in combination with reverse-diagonal calculations from the matrix illustrated in FIG. 11.

A system of this invention may display the highlighted/marked-up data file, whether a text document or an audio or image or video data file, in several ways, as noted above. Where two or more editors disagree, a decision has to be made on how on the most meaningful way to synthesize and display the highlighted/marked-up data file. The way(s) to accomplish the synthesis and display may best be decided based on the medium of the data file and underlying subject matter. When two users disagree on the relevance of a highlighted segment, the system may calculate weights for each user's selections and use the relative weights for decision as to how the highlighted material would be displayed to the reader. The weights, for example, may be based on the users' expertise level, where the user with a higher level of expertise in the area would have a higher weight than a highlight made by a novice.

The general method of using weights would allow, as a special case, for the integration of one editor's highlights into the collection of highlights created by previous editors. The weight for the collectivized highlighting would generally be higher than that of a single editor because it represents the collective opinions of many. In most cases, if a single editor adds a highlight that agrees with the collective, the weight of the collective increases. If the editor disagrees, then the weight decreases. As the weight increases or decreases through integration of the highlights by several editors, the display to the user reflects the change in the relevance or meaning of a highlight.

Other methods of statistical and probabilistic calculation, well-known to those skilled in the art, to measure values of parameters such as "relevance" are contemplated. For example, Bayesian models or Kalman filtering may be employed to rank the highlights and/or comments associated with the highlighting.

For the case of text files, another potential embodiment may combine highlights based on the number of highlights of each word in a segment. The more times a word is highlighted, in proportion to the total number of highlights in a segment, the higher its rating becomes. This process could be further improved by removing stop words from the calculation.

The method of this embodiment may be extended to non-text data files. For audio files a similar count may be kept, and used for synthesis and display of collective highlighting, of the number of times a particular word, note, syllable or sound (e.g., the sound of one particular instrument in an ensemble) appears or dominates in the file. For image or video files a count may similarly be kept of the number of times a visual feature or object appears in the file, and consequently may be favored in collective highlighting.

In one potential embodiment, an editor's expertise level is provided by the editor himself or herself. The system may include a registration system where the editor enters the fields of their expertise. This may be compared to the category of document the editor is marking-up. For example, if the editor's profile indicates a Ph.D. in Physics; for their edits of an article in the Physics category, the system may recognize them as an expert. The editor could also indicate his or her expertise in the sub-field of the document (nuclear reactor, e.g.). Thus, an expert with a Ph.D. in Physics may claim is no expertise in nuclear reactors.

In an embodiment, when the system automatically generates the expertise level of the editor, it could be based on any number of parameters. For example, the system could look at the editor's previous highlights, allow readers to rate each highlight, and then combine the ratings into an expert rating for the editor. The system could also take into account the number of previous highlights in a given category, or citations in scholarly public databases.

The system does not have to rely solely on crowd-sourcing ab initio to generate the highlights. Documents could be reviewed internally by humans before release. This "seeding" of the document highlighting would provide a foundation upon which editors could begin their own highlighting. Once enough outside editors highlight the document, the seeded parts will become diluted and eventually the highlights will be primarily based on the intelligent crowd.

In another potential embodiment, the system itself may have the capability, for instance on demand, to generate the highlighting. This could be accomplished through a comparison with user's previous history with similar content and subject matter. For example, the system may use the current reader's document viewing history, or the reader's background vis-a-vis previous editors to highlight a document, or may base the highlighting on the reader's behavior in reading the first few sections of a document.

The system may also determine the category of each highlight, in addition to the category of the document as a whole. For example, if a document was primarily about a legal concept, but also contained economic analysis, the system would categorize the entire document as "Legal" but could highlight the economic analysis and label it in the "Economics" category.

Another embodiment allows a user to select their role as either a reader or an editor. In "read mode," the user acts as a reader and views the document with accompanying highlights. In that mode the reader can add his or her own comments or highlights for their own personal use, but may choose not to share them with others. The reader can also view a list of all comments for each highlight in a separate pane of the display. The reader may be allowed at any time to switch to "editor/reviewer mode," where they can add highlights with any accompanying comments, and then share them with other users.

A user acting as an editor may also act as a reader/listener/viewer without explicitly switching modes. In one such embodiment, the user may have all potential actions available to him or her, whether as an editor or reader. Thus, as an editor he may share the highlighting or comments but also be given an opportunity to keep some highlighting or comments for personal use only. For a reader/listener/viewer to switch mode to editor may only be possible in some embodiments, after satisfying the requirements for an editor, e.g. completing the profile.

To help determine a relevance rating or an expert rating, the system would store user data of past activity and apply it to these calculations. For example, if an editor often highlights segments from advanced physics publications, the system could automatically improve his or her expert rating in the area of physics. For a reader, the system could track which type of highlights the reader often rates as relevant, and adjust the rating accordingly.

The Role of User Comments in Processing/Synthesis of Data Files

In certain algorithms for synthesizing the highlights, the comments accompanying the highlights may be used to provide or modify the weights; this calculation may be in addition to statistical or probabilistic computations of the highlighted segments.

User ratings are one factor that may be used for rough, "statistically based" decisions, but other potential embodiments could employ much more sophisticated statistical methods known in the art. One system applies Latent Dirichlet Allocation (LDA) to compare and contrast comments.

For the case of documents, this method first takes a training data set and divides it into a pre-set number of topics. The number of topics will need to be adjusted to find the most accurate representation for the system. The algorithm then calculates the probability distribution of each word within each topic. It also computes the probability of each topic occurring in a document. Once these probabilities are calculated, the algorithm can then apply the model to new data, and output a vector of the probability of a given word appearing in a given article or topic.

Applying LDA to this invention, when an editor implements a new comment, the system would create a probabilistic vector for the new comment. By then multiplying the vector with already existing comment vectors, the system can compare the similarity of comments. If the product is within a certain threshold, the system will group the comments together. The grouped comments may allow a reader to see what the "crowd" believes is the significance of a highlighted segment. For example, if multiple editors labeled a segment as "important," "vital," "essential" and "fundamental," then the system would group these together. This would make the purpose of the highlighting immediately recognizable by the reader. This is particularly useful when the highlighted segments are long, complicated or unwieldy.

Comments may be compiled in a similar fashion when the underlying data files are non-text but comments are textual (as they are generally expected to be), and LDA may be used for grouping the comments for audio/video/image data files.

The comments to highlighted sections, as well as comments to other comments, may take any digital representation. Thus, in one embodiment, the highlighting in combination with dynamically alterable comments, may lead to other novel ways of consuming and interacting with content. For example, an instructor might embed questions, or instructions to generate customizable questions, for the reader of a document for a truly self-directed study.

In another embodiment, the editor may input connections between highlights. This could be in the form of comments, for example, that allow the editor to specify references to multiple highlights. For instance, if the underlying content was a legal case, an editor could highlight a segment where the court recites the facts and then connect it to a segment where the court applies those facts to the rule of law. These connections may also allow a reader to track certain aspect of a document, such as a particular character or theme.

Additionally, it is possible in this embodiment to allow the connections between comments and highlights to carry over from one document to another document with similar or related content, and for the system to suggest, or for the reader to daisy-chain, connections between the highlights and comments in the two different documents.

It is similarly possible in a variant of this embodiment to allow an editor to input connections between highlights for the case where the data files are audio, video or image files, etc. It is equally possible for an editor to indicate connections between files in different media, such as when a document relates to recordings of a song and/or film clips which may be inserted in the comment field. The method of the present invention may in fact provide a rich modality of communication when used in this manner.

Displaying Marked-Up Data Files

The central idea behind this invention is that a consumer of information will benefit from the knowledge and expertise of all previous consumers of same or similar information, guided by their collective intelligence as to the most important sections of the data file, thereby improving consumption efficiency and comprehension, and user experience.

It is noteworthy that by highlighting segments within the document, leaving the underlying content intact, this invention could allow the user to place relevant sections within the context of the whole. This also allows the user to discern which general areas of the file are more important by identifying the sections with one or more highlights.

The representation of the highlighted versus non-highlighted portions at any level of relevance or importance could be enhanced by showing the proportion of content that is skipped between successive highlights, either visually or by another quantifiable display parameter. Thus, for example, in the case of a ten-page article with content of a certain reader's interest of only about 10%, it will quickly allow that reader to see that content without rummaging through the remaining 90%, and see where the important 10% and the unimportant 90% of the content lie.

In a potential embodiment, the user may select from a wide range of parameters to suit his or her individual needs. He or she may elect only to view highlights by editors of a certain expertise level. The reader may be an expert in the field, and wish only to view what other experts believe is important in the data; or s/he may select to view highlights that refer to certain subject matter, or that are above a certain threshold of relevance.

The parameters may also include the amount of time a reader wishes to spend on a document; or the number of words he wishes to read. Other such parameters may also be introduced and employed. For example, a reader may wish to see the sections of a document above a specified level of relevance compared to another document previously perused by the same reader.

In addition to the consumer entering his or her own parameters, the system could automatically generate them as an option. For instance, it could do so based on their consumption history and/or highlighting, based either on the current previous similar data files. In addition, the system could generate the list of parameters based on a statistical determination of the relevance threshold the reader favors or requires.

More generally, several novel paradigms of displaying a document may be utilized within the scope of this invention.

In one embodiment, the reader may control the presentation of the content via a means or modality that facilitates quickly skimming through the file. In a document, for instance, instead of coloring highlighted sections, everything but the highlighted sections could be faded out. This would allow the reader to quickly and efficiently read only the most relevant content. Also, the display may start with all but the most relevant content sections faded out, bringing other sections of decreasing relevance into display if and when the reader indicates readiness.

In addition to assisting comprehension and improving reading experience, with the proportional indication of the skipped portions, such display of relevant content can work for small display screens, such as those of smartphones.

The unfolding of the content in order of levels of significance or relevance to the reader could be particularly helpful to certain categories of students, such as special education students with reading or learning difficulties, second language learners and adults returning to school.

In one possible embodiment, the system may display the highlights in different colors and shades based on relevance. For example, as described above, one possible method for combining highlights is the average number of times a particular word is highlighted. In this embodiment, the system may display more frequently highlighted words in a darker shade and less frequently highlighted words in a lighter shade.

In another embodiment, the user sets the pace at which a document is displayed. This allows for the system to automatically change to the next page at the speed the user selects. The setting could also be determined by the system based on the document's category, the user's history, expertise or other such parameters.

One potential embodiment of the invention permits the user to view the data in visual form. This may take the form of a hyper-graph: This hyper-graph would use the highlighted segments as nodes which would be logically connected, to show the reader how different areas of the document or documents relate.

In a further potential embodiment, the reader may print out or otherwise reduce the key parts of the document into a different portable form. For example, one may print out an form of the document, abbreviated by using the current system and methods. Or, download reduced versions of several documents on a mobile device, such as a smartphone, tablet or iPod.

In one potential embodiment, the system may suggest to a reader other relevant documents. This may be based on the system parameters, reader's viewing history, highlights, comments, expertise level, or a combination of any of these attributes. In addition, the reader might request that the system produce the next article based on the next rank of expertise. In this implementation the documents would be ranked by expertise based on preset criteria and stored in the system along with such attribute information.

In another potential embodiment, the system could allow users to tag content in addition to highlighting. A tag is a qualitative descriptor of a segment of a document. This would allow an editor to describe a segment as, for example, a "key historical fact." A reader could then use these tags to cycle through each "key historical fact." The system may also include a tag cloud, which would display common tags and allow a reader to choose from among them.

When the underlying content of a data file is sound, the editors may highlight relevant portions of the sound in a similar way to text. For example, in a song, the editor could tag a particularly complicated musical section, or lyrics with a particular meaning. Listeners could skip to only the tagged portions of the song. Another example would be the recording of a lecture, or an audio book, where editors highlight the most important sections.

When the underlying content is a video, or other audio-visual work, an editor could highlight and comment on particular sections of the video, including just a small visual portion of a single frame. Meaningful tags may be alternatively employed for differentiation as well.

In the case of purely visual works that do not include text, like paintings or compilations of art works or holographic images and videos, the editor could nevertheless highlight relevant portions of the works by the methods outlined above with modification discussed above.

In one potential embodiment of the invention, a paper document that has highlights physically written on it could be scanned into the system. The system would convert the scanned image into one it could read, and then convert it to the same format as similar documents. The same concept can be applied to inputting audio, visual, or audiovisual works into the system.

Other special cases may be processed by similarly extending the method. For example, the highlighted portion of a song may be tagged with some musical descriptor. Or, highlighting of a mathematical, statistical or chemical content segment may be tagged with a graph or a diagram.

Further Advantages and Concerns Associated with the Method of the Invention Advantages of Highlighting Methods of the Invention The multi-step marking up of data files disclosed herein carries with it significant advantages. The prime advantage is that in the first (or first few, for some embodiments) passes, the user does not need to slow down in the read, listening or viewing, the primary data to highlight the segments of importance or interest. Instead, the user would indicate the broad/coarse segment with a single action, let the system maintain a record of the coarse highlights, then return at a more appropriate time to delineate the highlights more precisely.

This method optimizes the efficiency of consumption of information. By not interrupting the flow of information intake, it allows the user to utilize his or her mental resources in the synthesis of the information consumed. In returning to the coarsely highlighted section, the user gains an opportunity to review and reinforce the material, and may indeed decide upon returning to the section either on a slightly different segmentation to highlight, or that the segment is not significant after all. Either of these possibilities may enhance a user's consumption of information or the quality of highlights produced if the user is an editor.

Another significant advantage of multi-pass marking up of information files is this: the computerized system of this invention may more effectively render assistance to the user. The system may present all the coarse highlights on demand (or for instance, routinely upon exiting the program) and invite the user to complete the marking up at the finer level.

For certain user communities, such as those with learning challenges, or those dealing with particularly complex material, or those pressed for time, this assistance could be a boon.

The multi-pass marking up of data files envisions a hardware, software or hybrid component as part of the implementation of the computerized system. Such a system will have memory unit(s) to store user decisions, as well as on board processing ability to do the computations for coarse or finer highlighting as described above in "Forms of Highlighting." In particular, the input/output sub-component of such a component may generally implement the special commands associated with the highlighting functionality described above. An example is the calculating of the boundaries of the coarse highlight from the placement of a single click or icon within those boundaries, or possibly, the weights for synthesis of highlights provided by two or more distinct editors.

The system may also assist the human or automaton combining the inputs from a crowd-sourced matrix by presenting the "raw" (coarse) highlighting data for the final synthesis.

A "coarse level" highlighting may be specially useful for video highlighting, though possibly less so in case of a single image. Precise highlighting may take too fine a control and too "long" an interruption, but a coarse identification of the object of interest, say, by drawing a rectangle frame around the object of interest will be fast and efficient for many users.

The method may be useful for a single image where it is advisable to display the significance/relevance of segments of an image by showing the image emerge from a fade out in sections according to significance matrix.

The mechanism of coarse highlighting will work well for audio files (with a suitable meaning of coarse highlighting), thereby relieving the user from the need to precisely mark the beginning and end of a segment. For audio, coarse highlighting is a more difficult exercise than approximate marking for video, because of the lack of visual cues. The system can provide valuable assistance for marking up in a subsequent phase when the markings are made precise by playing back the coarse segment faithfully while the user engages in precise highlighting.

In a further potential embodiment, the system allows editors to compare two or more documents through highlighting. This comparative highlighting allows a reader to efficiently view the differences and similarities of the documents. This could be useful, for example, if presented with two long contracts from two different cell phone companies. Much of the boiler-plate may be the same, but comparative highlighting allows a reader to quickly see the differences in key-terms, allowing him or her to make a more informed decision without having to wade through the complex legal terms. This could also be accomplished automatically by the system. In an enriched version of this embodiment, the system could produce a tabulation of the key differences in a chart or spreadsheet.

Coarse identification of related segments may be particularly useful for relating of the objects/segments across data files.

Concerns

A system which stores user information will typically raise various privacy concerns. To alleviate these concerns, several embodiments are possible. The system could allow for users to select to remain anonymous, and not store certain key data or any data about him. Alternatively, it could assign a unique user ID to an anonymous user. This would allow the system to track and retain user history without storing any personal identification. Another possibility is to have unique user-name and login but not to display it publicly. One embodiment could allow a user to select from these options or to elect not to have any privacy controls at all.

However, the system of this invention may have other, advantageous implications for security as well. It may, for example, hold an advantage in addressing security concerns of certain classes of documents and sensitive vendors with a practical solution. The system may be implemented to allow the marked-up document to be read/viewed etc. directly on a cloud, obviating the need for an individual reader to download the document from a vendor's site to the consumer's machine. Such an implementation may provide the benefit of protecting the security of the vendors' or user's systems. The burden of security would be shifted to the system of this invention, where it can be tackled aggressively, but at an overall lowered cost of security protection.

Further explanation of the method is provided below by illustrations depicted in the drawing figures.

DETAILED DESCRIPTION OF THE DRAWINGS

FIG. 1 illustrates the basic structure of the invention. When a document is retrieved by the server, it first checks to ensure that it is in the proper format, and converts accordingly. Then if the document has not been reviewed before, it is sent to the review process. If it has been previously reviewed, then the user can either choose to read or review the document themselves. The reader may also use a combination of the two processes. In this Read/Review process, the user can seamlessly switch between the editor and reader roles, which are described in detail below.

Figure 2:
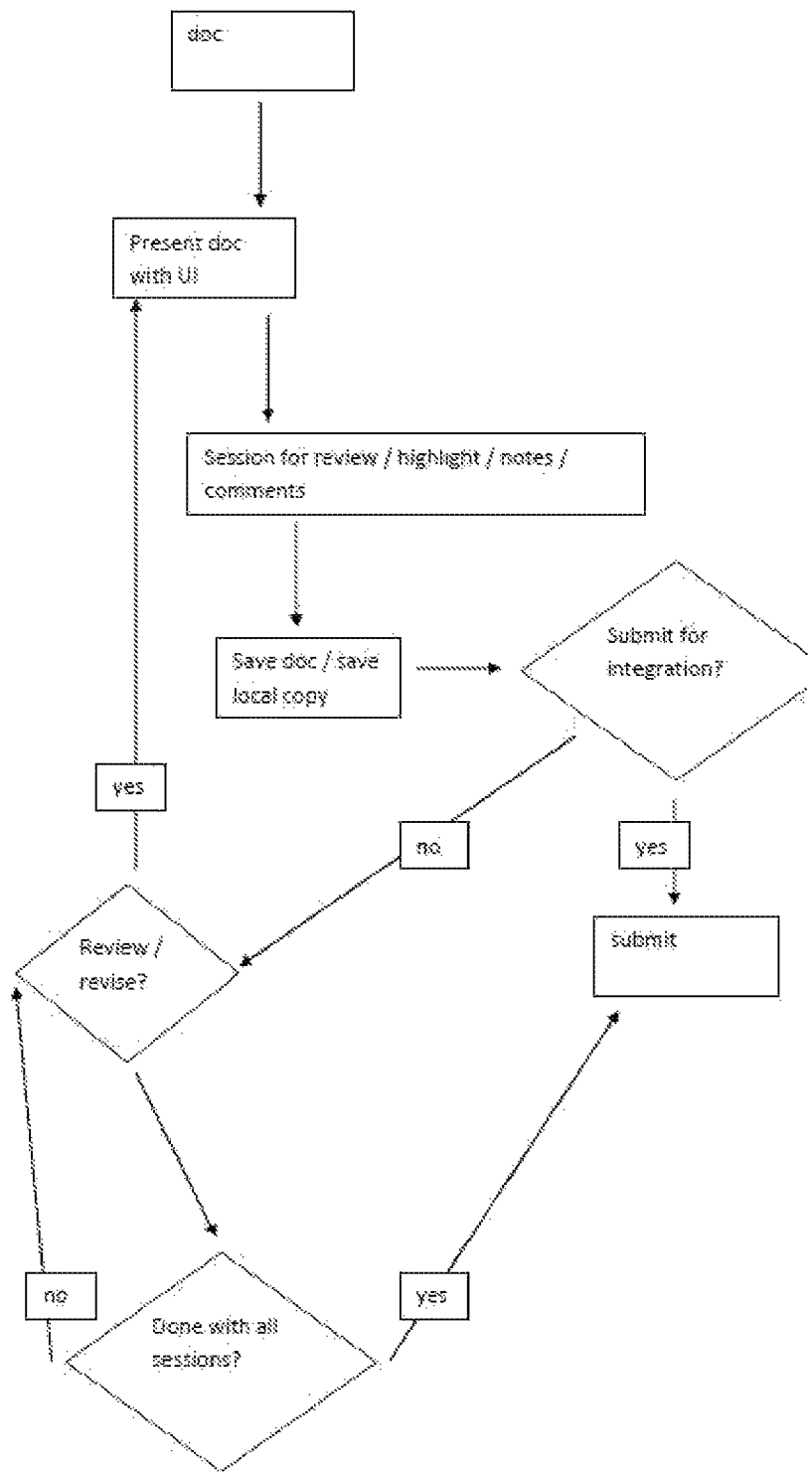
FIG. 2 is a flow chart of the review process shown for documents; the process is identical to the one for alternative media files. This allows the editor to mark-up segments and add comments to the document/data file. It also processes the editor's expertise level, either through a stored value or an entered one.

FIG. 2 demonstrates the review process. When the user first retrieves a document in 10, he or she may first enter their level of expertise etc., 20, or proceed straight to editing the document, 30. The editor may then mark-up segments and add comments to the document, which will be saved and sent to the server periodically, 40. The user is asked if they want to submit the document for integration with the collective document, 50. Depending on the user input it can go to box 60, Submit for integration, or 70, Review or revise document. Based on the document type and the highlights and comments made, the system may also calculate an Expert Level rating, when submitted. At the end of the editor's sessions, 80, the highlights and comments will be uploaded and available to all other users. The editor may also publish the mark-ups at any time during his or her session.

Figure 3:
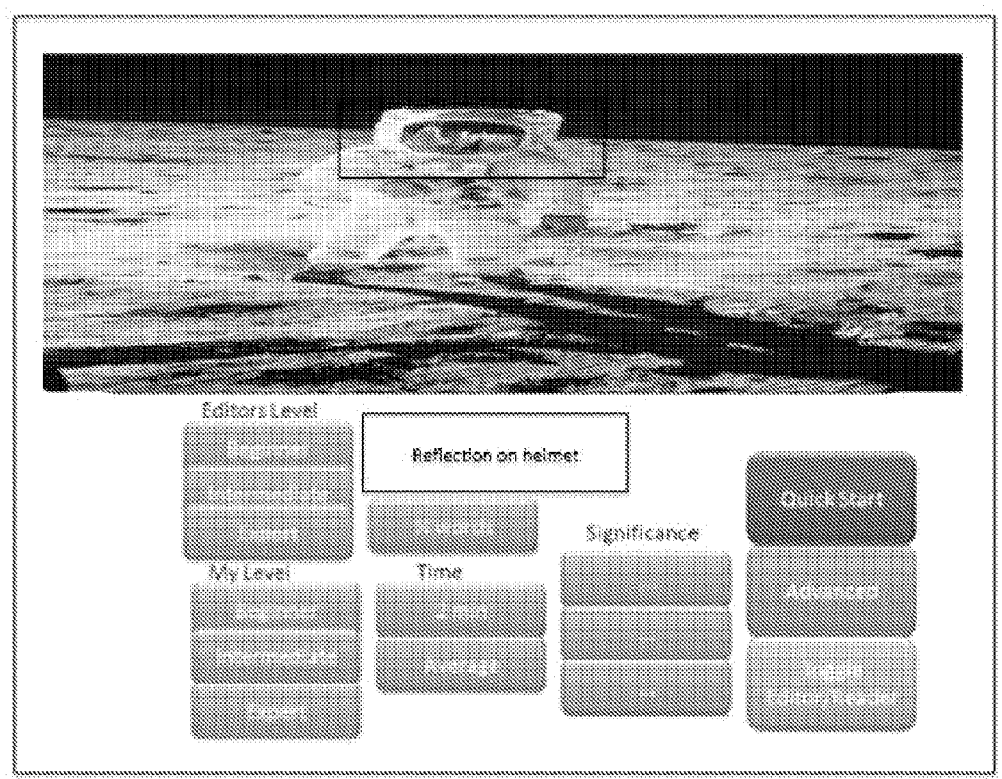
FIG. 3 is an illustration of coarse highlighting of an image.
Figure 12:
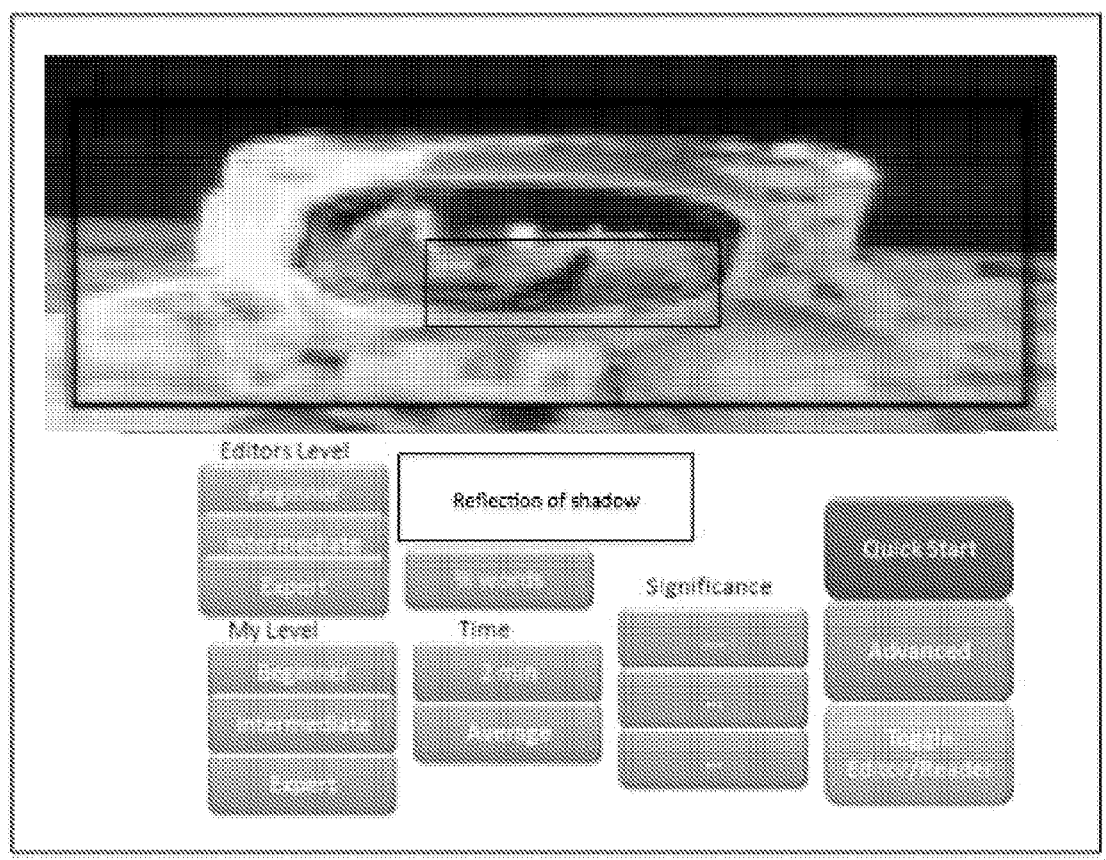
FIG. 12 illustrates coarse to finer markup, as described in "multi-pass" highlighting. Outer box just inside the image was the coarse markup in pass 1, while the inner box around the shadow reflection is the finer markup in pass 2. Similarly more iterations can be performed.

FIG. 3 depicts an illustrative "coarse" highlighting of an image. Here the user is assumed to attempt a highlight of spacesuit's helmet. But rather than slow down to precisely define that object, the user places a "box" that includes the object of interest (i.e. the helmet). The related FIG. 12 shows how the user may return at a later time to precisely delineate the helmet within the box.

Figure 4:
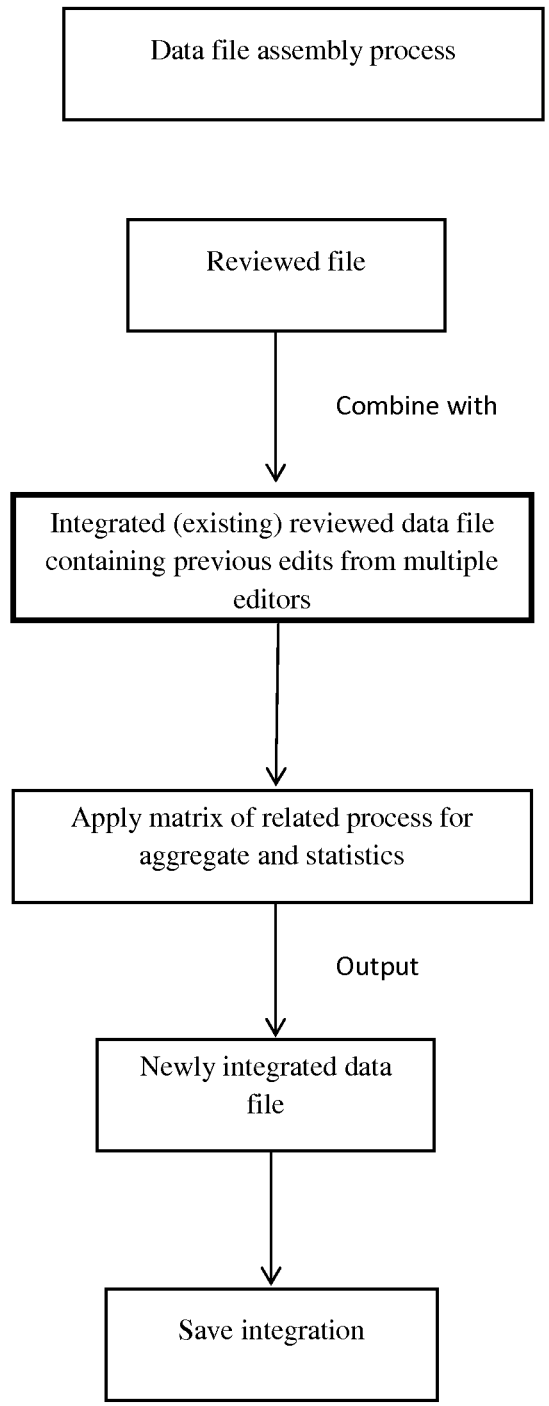
FIG. 4 is a flow chart of a process for integrating a newly marked-up document into the document with mark-ups made by previous editors.

FIG. 4 demonstrates the process for integrating a newly marked-up document. After an editor adds highlights and comments to the document, it is then combined with the previous version. In this particular embodiment, this is done using a matrix calculation. The output is then stored and becomes the new version of the processed document which will be retrieved by the next reader.

Figure 5:
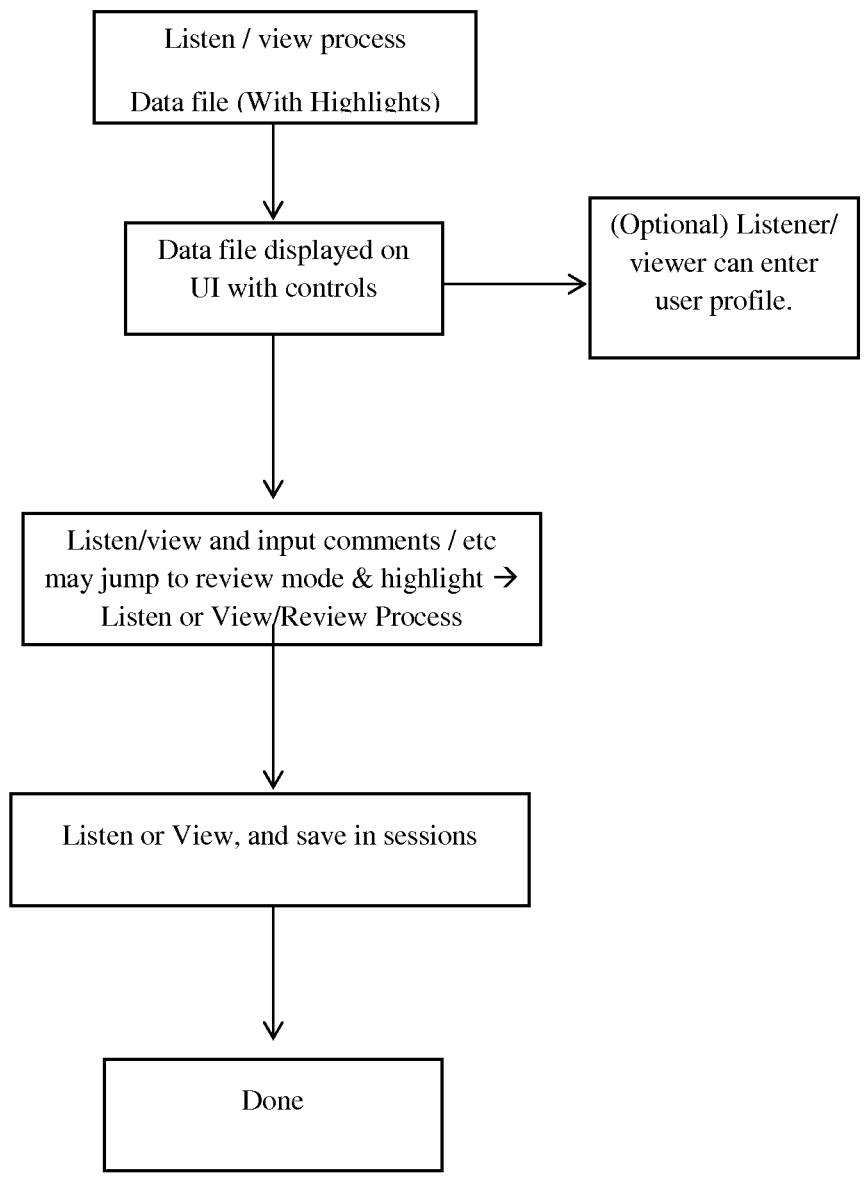
FIG. 5 is a flow chart of the Listen/View process.

FIG. 5 depicts the read process. The requested document with the integrated mark-ups is displayed with User Interface controls for the reader. The reader may optionally enter their user profile. The reader may make mark-ups and comments for his or her own personal use, but unlike an editor's profile, these will not be shared with other users or integrated into the document. Any highlights and comments made will be stored for the reader to use at a later time.

Figure 6:
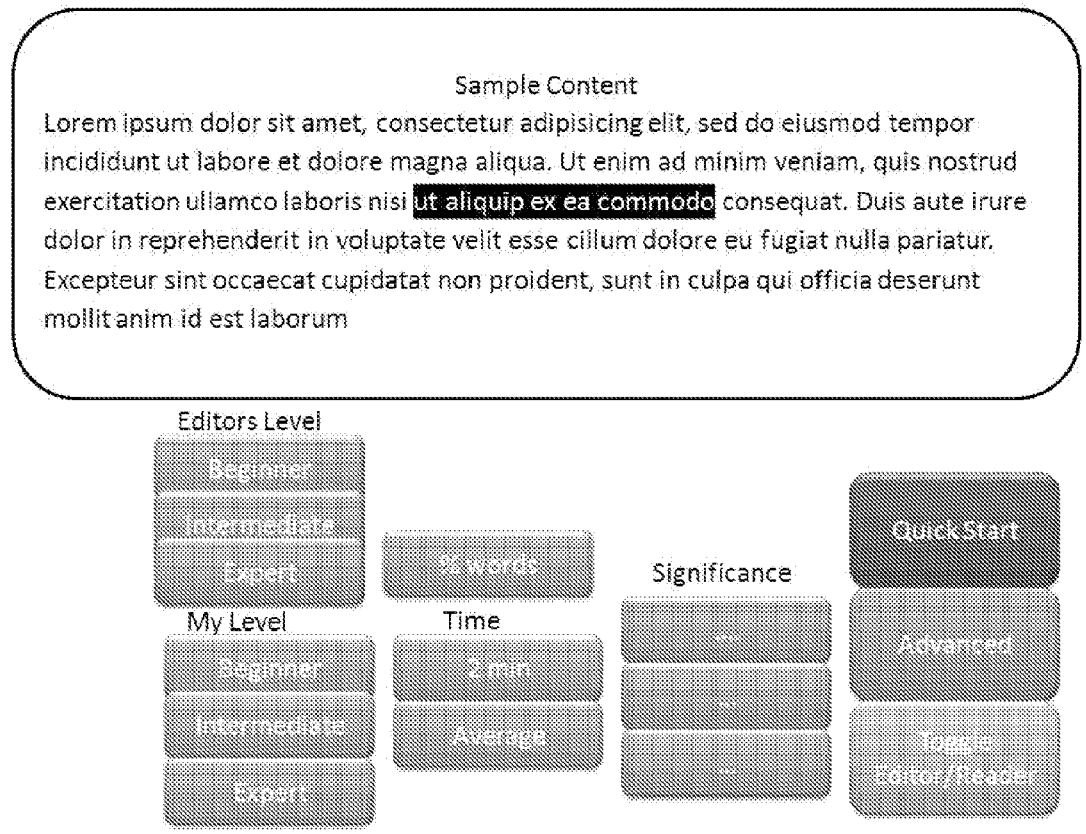
FIG. 6 is a screen shot of a sample user interface for reading a document.

FIG. 6 is a screen shot of a sample user interface. It shows the buttons that a user can use to change to the highlights displayed. The user may show highlights that are made only by users with a high expert level, and can enter their own level. They can also set the amount of time they wish to spend reading the document. For example, if the user selects two minutes, this will display fewer highlights than if he or she selects ten minutes. The user may also switch to editor mode, and enter his or her own highlights and comments which are shared with other users. In other embodiments, the switch between modes is not required, as the user may act simultaneously in both roles.

Figure 7:
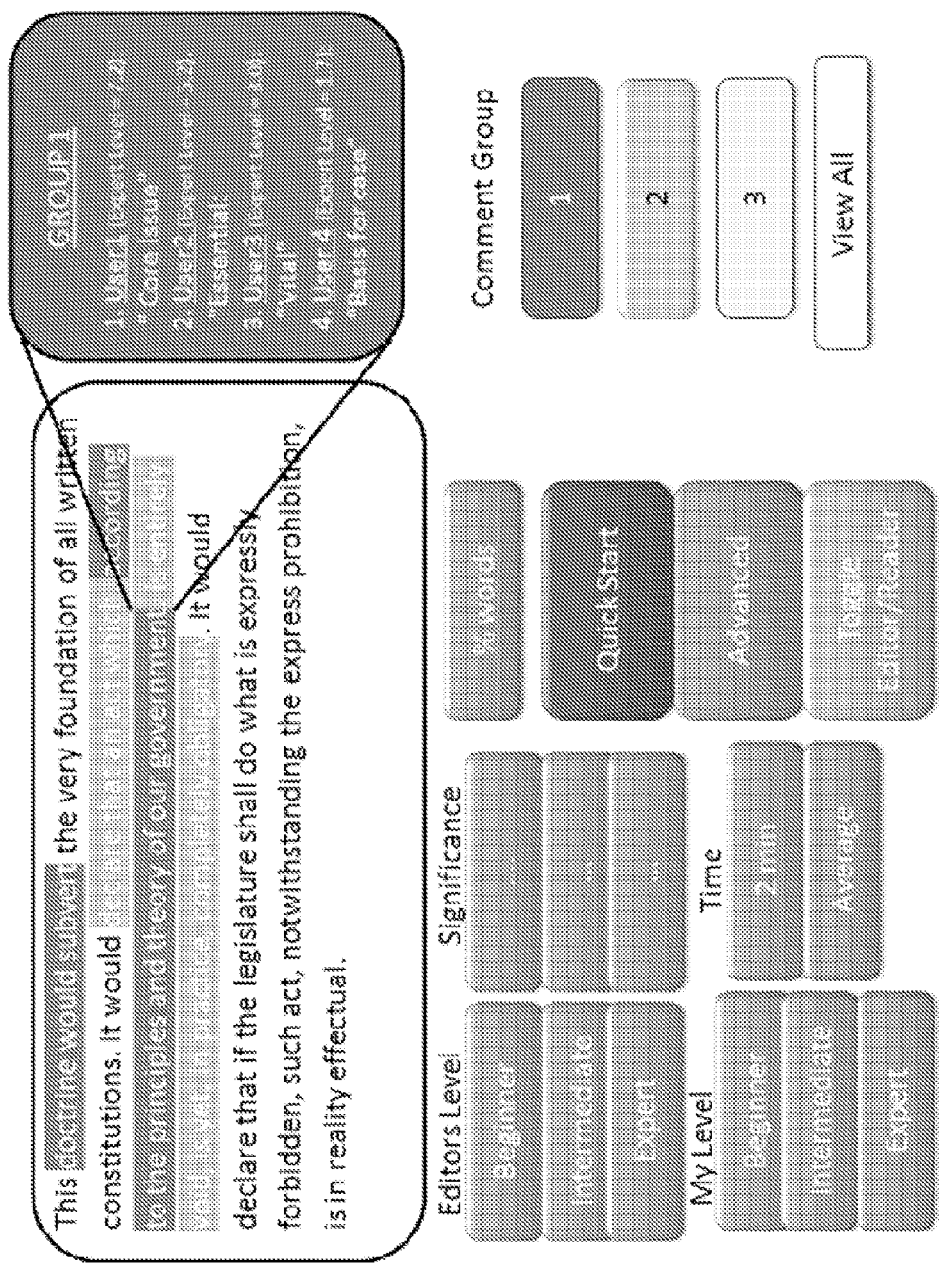
FIG. 7 is a screen shot demonstrating how highlighting by multiple users and their associated comments are displayed for the case of reading of documents.

FIG. 7 demonstrates the user interface of the system once multiple editors make highlights and comments. Highlights from past users are displayed. The color and/or shade of the highlight indicate its relevancy. In this particular embodiment a darker shade indicates a higher degree of relevance. As discussed above, the definition and calculation of relevance may be either user- or machine-generated.

When a reader selects a particular segment in this embodiment, a pop-up window is displayed. This window contains comments from past users. In this particular embodiment, the comments automatically grouped together based on statistical similarity, and then each group is ranked for relevance. The user may select to view any group, or all groups simultaneously. Each user comment is displayed along with the user's expert level.

Figure 8:
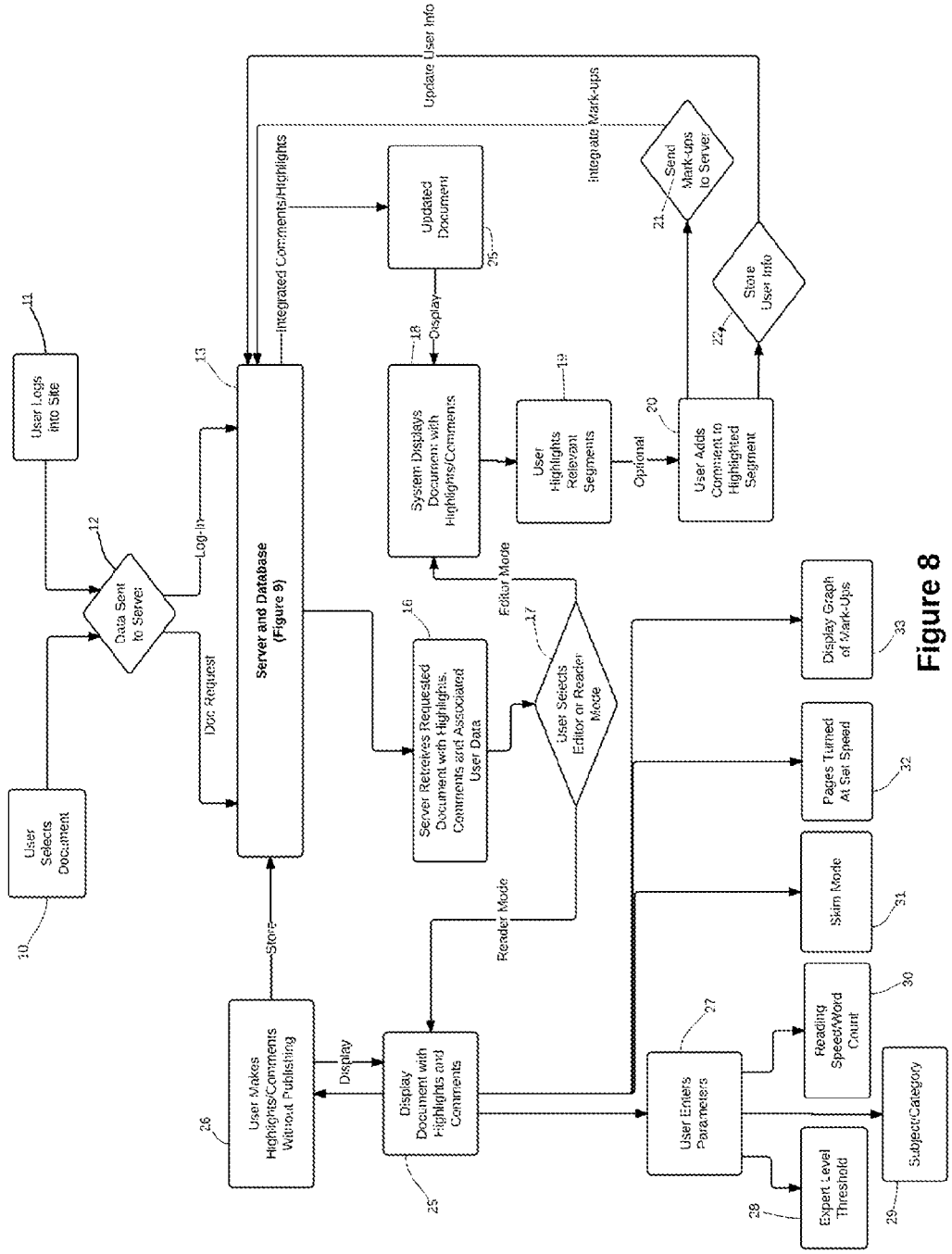
FIG. 8 is a chart describing how the user interacts with the backend of the system for the case of reading a document. The flow of the case of a listening/viewing user interacts with the system in closely parallel ways.
Figure 9:
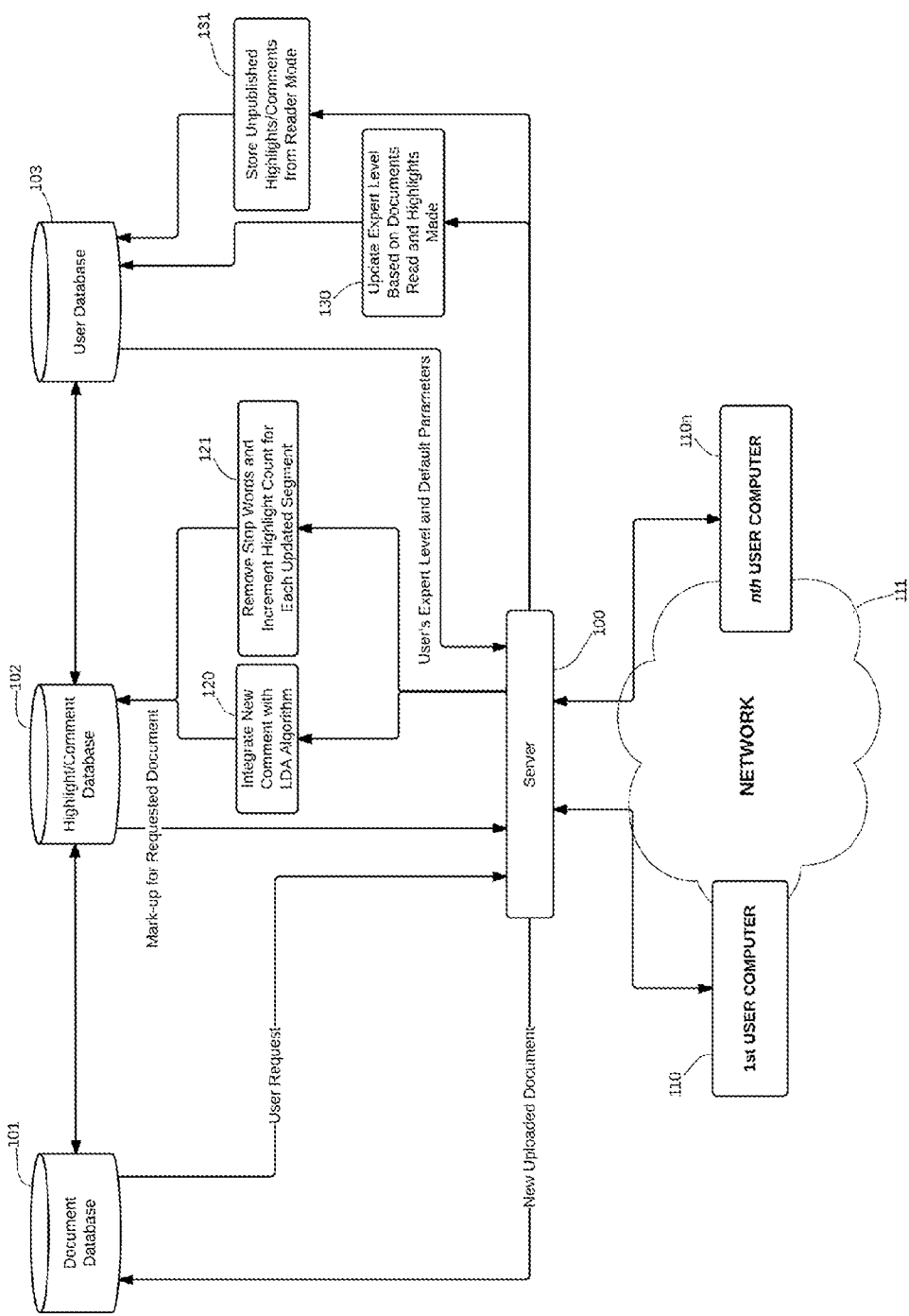
FIG. 9 is chart depicting one layout of the backend of the system.

FIG. 8 is chart describing how the user interacts with the backend of the system. The user begins by selecting the document they wish to view or edit 10. They may also optionally log into the system 11, allowing them to used stored parameters and expert levels. The document request and log-in information is sent, 12, to the server 13. The server 13 retrieves the requested data (as shown in FIG. 9) and displays to the user the document with associated highlights and comments, in addition to any user data, 16.

The user may then choose to act in the role of either an editor or a reader, 17. The system need not require a user to make a clear choice, and may instead simply determine which role a user is acting in based on the actions taken. For example, if a user adds highlights and publishes them then he or she is recognized as an editor, but if the highlights are stored but not published, then they may be considered as acting as a reader.

In editor mode, the system displays the document to the editor with the associated highlights and comments from previous users, 18. The editor then adds highlights to the sections deemed relevant, 19. The editor may optionally add comments with the highlight, 20. In another potential embodiment, the user may add comments entirely independent from any highlights.

Next, the editor will send two sets of data to the server. First, the newly added highlights and comments are sent 21, where the system backend will integrate them with the previous version (FIG. 9). In addition, the editor's user information will be updated, 22, which includes the information about the highlights and comments made. These two data sets may be sent to the server periodically as the editor is working, automatically once any highlight or comment is entered, when the editor presses the "Submit" button, or any combination of these three events. Once the new highlights and comments are integrated in the server at 13, the updated document is displayed for the user at 25.

In reader mode, the system displays the stored document with its associated highlights and comments, 25. The reader may then enter parameters at 27, to customize the mark-ups displayed. This may include only mark-ups from users above a specified Expert Level Threshold at 28, highlights and comments from a particular subject, 29, or a certain number of mark-ups that will allow the reader to read the document at a particular speed, or within a set number of words at 30.

Aside from entering parameters, the reader can also change the method of display. The reader may use skim mode at 31, which obscures non-highlighted text. He or she may also set the system to automatically switch pages at a specified speed, 32. Another option is to view the highlights and comments in a different manner, 33, such as through a graphic or other such visual representation.

As a reader, the user may also add highlights and comments without sharing them with others, 26. When a reader does so, the mark-ups will be stored with the user data for later use, and then displayed whenever the user views the document.

FIG. 9 schematically depicts an exemplary embodiment of the present invention. It comprises a server 100, data storage means 101, 102, and 103, and a plurality of users' computers labeled as 110 and 110*n*.

A user computer 110 connects to the server 100 using a communications network 111. The communications network may be the Internet or a local network of any size. User interactions with the system on the backend are detailed in FIG. 8.

The system backend provides the storage and calculation functions. When a new document is uploaded to the system, it is stored in the Document Database 101. The system then retrieves the document upon user request. In another potential embodiment, no document database exists and the documents are stored outside the system. For example, if a user were to load a website from another source and, possibly compute and then, load the associated highlights and comments from the system, requiring the system to overlay these mark-ups over the external content.

When the system backend receives a request for a document, in addition to retrieving the document itself, it also acquires the associated integrated highlights and comments from the Highlight/Comment Database 102. The highlights and comments overlay the document. These mark-ups could be user- or system-generated and then combined to allow for reading efficiency and comprehension. When a user submits a new highlight or comment, they are combined with existing highlights and comments through one of the methods of collectivization, at 120 and 121. Because of their distinct nature, highlighting and comments may be integrated using separate methods of collectivization.

The system stores data from each user in the User Database 103. As discussed in this Detailed Description, the data may include selected parameters for display and a history of documents viewed and annotated at 130. The User Database 103 also stores a user's expert rating in a particular subject, 131.

FIG. 10 demonstrates one method for integrating highlights from different editors. If two editors highlight completely distinct segments in a document, then both highlights will be displayed.

If another editor then highlights the same segment as another user, the part which overlaps will be given greater relevance, and therefore be displayed in a differentiated manner, such as, a different shade or color. In FIG. 10, greater relevance is shown by a darker shade. Thus, the segments only highlighted by a single user are a lighter shade than the segment two users highlighted. The shade/relevancy does not necessarily need to depend solely on the number of users who highlight a given segment. It may also take into account expert level, and other factors discussed in the Detailed Description.

The system also takes into account the fact that editors may intend to indicate relevance of the exact same segment, but may vary slightly as to where the segment begins and ends. In FIG. 10, the two segments are "This doctrine would subvert the" and "doctrine would subvert." Both editors are indicating the same segment as relevant, but one has included the words "this" and "the." These are known as stop words, which are words that are very common and do not add meaning to a phrase. In this particular, the system will identify "this" and "the" as stop words using a list of such words and remove them from its overlap analysis. Thus, the result is that the relevance of the segment is properly updated without "this" or "the" being highlighted.

FIG. 11 is one illustration of how two users' (editor's/reviewer's) highlighting may be synthesized into the collective highlighting of the document., and depicts the synthesis, that will generally be iterative, of one user's highlighting into collective highlighting. This example assumes four level of highlighting relevance, shown across for the user and down for the collective.

The "relevance" level of overlapping highlighting in this case is determined by a simple reverse-diagonal algorithm. Also, this example assumes that equal weightage is given to the one user's highlighting as the collective, which generally will not be true.

Other cases involving different weights, or criteria for highlighting other than "relevance," larger number of levels of differentiation than four, and different algorithms for computing synthesized highlighting etc. may be handled by the system in a similar FIG. 12 illustrates how coarse highlighting may be followed by finer scale highlighting for an image. This figure shows the finer highlighting, shadow on the helmet of the space suit, that lies within the box depicted in FIG. 3.

FIG. 13 depicts an illustrative structure of the reviewer's stored profile. When a user logs into the system, the server will retrieve the associated user data, and begin a session. As described above, the user's profile contains their expertise level, history, and default parameters, among others. As a user performs functions in the system, the data is stored in the User Database.

Glossary of Terms

The terms "highlight" and "mark-up" herein refer to any method of distinctly selecting a portion of the overall content and then displaying the selection to the reader. This includes underlining, tagging, or any method of stressing or emphasizing the importance of a segment.

The term "comment" refers to a word, picture, graphic, sound or any combination of similar expressions which may be directed to a particular segment of a document and be associated with meaning by one or more users. A comment may be associated with a highlight. It may refer to the highlight as a whole or in part. It also may not be associated with any highlight.

The term "user" refers to the entity interacting with the system. This may include one acting as an editor, reader or both simultaneously. It may also include entities acting as listeners, viewers or other consumers of the content of a data file.

The terms "editor" and "reviewers" refers to the "intelligent crowd" of users who have previously read the document or consumed the data file and added highlights or comments. They could be either human users or machines.

The term "reader" refers to a user who perceives the output of the system, a document with highlights, and may include suitable machines.

The term "document" or "article" refers to any tangible medium of expression. This may include text, audio, and video, among others. This may also refer to multiple individual works that are in any way combined. This term is not limited to a file. It may also take the form of a feed or a data stream. The terms "application data file" and "data file" wherever used, include "document" and article," and the actual data within any of these files is the "content" of the file. The method of the present invention requires that the document be in a computer readable format for at least some part of processing by the system.

A segment of the data file is an identifiable portion of the data file which may be referenced as such by the editors, reviewers or consumers. For a document, for example, it may be a word, a phrase, a sentence or a paragraph, or even a character, alphanumeric or special character, or one or more page lengths in the document. For a video file, it may be an individual frame or cel or part of either that can be identified therein. For an audio file it may be a note, syllable or a fraction thereof or one or more word of a song. Segmentation of a file refers to its division and reconfiguration into segments.

The term "efficiency" as used herein includes reading a document within a specified amount of time, within up to a specified number of words, within a specified level of content significance, and marked up to a specified level of previous reviewer's expertise.

The term "crowd-source" or "crowd-sourcing" refers to the system of having end-users contribute to the system, thereby increasing its effectiveness.

The term "tag" refers to a qualitative descriptor of a segment of a document.

We claim:

1. A system for processing data files comprising the following locally or remotely connected computerized components:
   (a) processor component or components for receiving and storing data files;
   (b) processor component or components for receiving by one or more computerized inputting means inputs from a plurality of users and storing said inputs;
   (c) processor component or components for receiving by one or more computerized inputting means the user highlighting of one or more identifiable segments of a data file;
   (d) processor component or components for recording and storing user highlighting of identifiable segments of a data file;
   (e) processor component or components for synthesizing by preset computational or algorithmic rules the contents of two or more highlighted segments;
   (f) processor component or components for reconfiguring the highlighted segments based on the said synthesizing, including replacing the two or more highlighted segments with new sets of segments from their combined content;
   (g) processor component or components for generating collectivized highlighting and segmentation of the contents of a data file by synthesizing two or more user highlighted segmentations of the data file.

2. The system of claim 1 comprising the following additional elements:
   (h) processor component or components for receiving a user's notes or comments associated with said data file or with one or more segments of said data file;
   (i) processor component or components for saving said user's notes or comments in a database;
   (j) processor component or components for interpreting and executing instructions for selecting said one or more identifiable segments based on said notes or comments to generate collectivized highlighting.

3. A method of processing a data file for computer assisted consumption comprising the steps of:
   (a) receiving highlighting of one or more identifiable segments of the content of said data file from a plurality of users;
   (b) saving highlighting of one or more said identifiable segments of the content of said data file from the plurality of users;
   (c) receiving computational rules or a preset algorithm for combining said highlighting of the identifiable segments of the content of said data file from the plurality of users into a synthesized set of highlighted segments;
   (d) combining by a processor and said computational rules or preset algorithm the highlighting of two or more sets of highlighting of said identifiable segments, wherein said sets may be of highlighting by two or more users or groups of users among the plurality of users, or by one user in two or more sessions;
   (e) reconfiguring by a processor, based on said combining, said identifiable highlighted segments of the content of the data file from the plurality of users, or replacing, based on said combining, sets of identifiable highlighted segments of said content with one or more new sets of highlighted segments of the contents of the data file;
   (f) synthesizing, based on said combining, the reconfigured or replaced highlighting of the one or more identifiable segments by said plurality of users into collectivized highlighting of the content of the data file;
   (g) generating a segmentation of said data file based on the collectivized highlighting.

4. The method of claim 3 further comprising the following steps:
   (h) receiving from a user a request for output of said segmentation or collectivized highlighting in a form consumable by the user;
   (i) providing the output of said segmentation or collectivized highlighting of said data file into the form requested by the user.

5. The method of claim 4 wherein said data file is a document and computer-assisted consumption is computer assisted reading.

6. The method of claim 3 wherein the highlighting from one or more identifiable segments is based on one or more predefined or machine-computed criteria, and highlighting from the plurality of users is synthesized based on one of the one or more predefined or machine-computer criteria.

7. The method of claim 6 wherein said criteria include user provided significance for one or more user identified purposes.

8. The method of claim 6, wherein distinct measurable values in a range are provided for association with one of the one or more of said predefined or machine-computed criteria and highlighting by a user of an identifiable segment is associated with a measurable value in the range, and wherein said computational rules or preset algorithm for combining highlighting include computational rules for combining highlighting associated with differentiated values in said range.

9. The method of claim 3 wherein one or more of the plurality of users provide notes or comments associated with said data file or with one or more segments of said data file.

10. The method of claim 9 wherein said combining or said synthesizing of highlighting is based on user provided notes or comments.

11. The method of claim 3 wherein said synthesizing comprises the steps of:
(s1) synthesizing the highlighting by two users into collectivized highlighting;
(s2) synthesizing the highlighting by combining the highlighting by a next user into the collectivized highlighting;
(s3) stopping the synthesizing if there is no highlighting from a next user to be combined or if there is no next user;
(s4) repeating step (s2).

12. The method of claim 3, wherein said highlighting of one or more identifiable segments comprises the steps of:
(h1) identifying as Segment of Interest a segment of said data file which contains at least one sub-segment to be highlighted;
(h2) receiving a datum associated with the Segment of Interest;
(h3) receiving the instructions to compute by machine the boundaries of said Segment of Interest using said datum;
(h4) saving in a database the boundaries of said Segment of Interest computed by machine;
(h5) highlighting one or more sub-segments within said Segment of Interest.

13. The method of claim 12 wherein said data file is a document, Segment of Interest is a paragraph and boundaries of Segment of Interest are beginning and end points of the paragraph.

14. The method of claim 12 wherein said data file is an audio file, Segment of Interest is an interval of time and said datum specifies a point within the interval of time.

15. The method of claim 12 wherein said data file is a video file, and said instructions are used to compute as visual part of the Segment of Interest a box contained in the visual images of the video file.

16. The method of claim 3 wherein said data file includes an audio component and said one or more segments comprise individually identifiable sounds from a mixed ensemble of sounds.

* * * * *